United States Patent Office 2,859,831
Patented Nov. 11, 1958

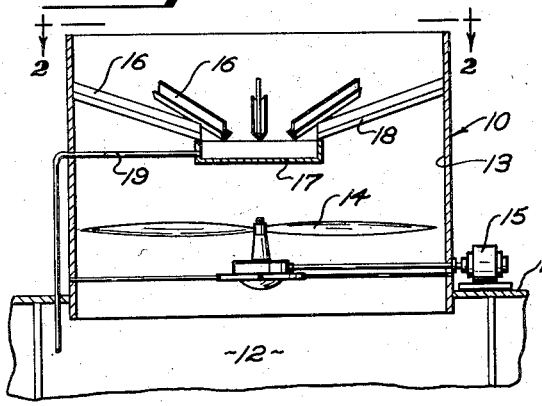
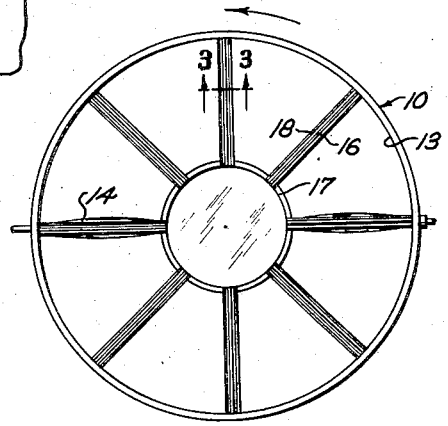
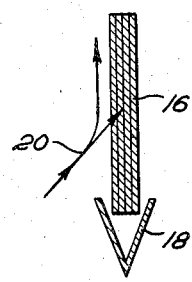
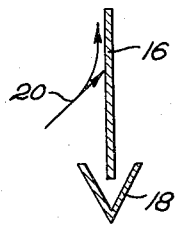
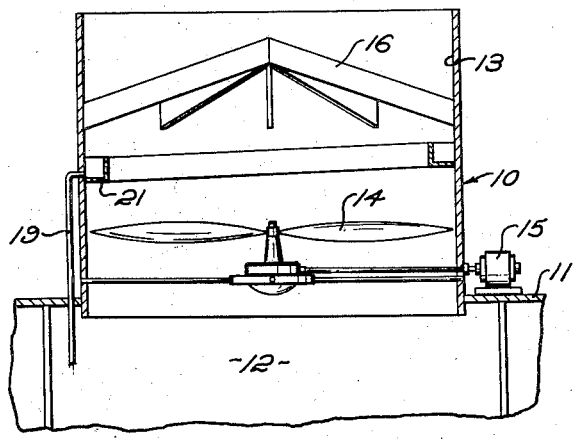
WILLIAM D. LANIER
ROBERT L. SOLNICK
INVENTOR.
BY
ATTORNEY Nov. 11, 1958 R. L. SOLNICK ET AL 2,859,831
COOLING TOWER MIST ELIMINATOR
Filed Jan. 9, 1956 2 Sheets-Sheet 2
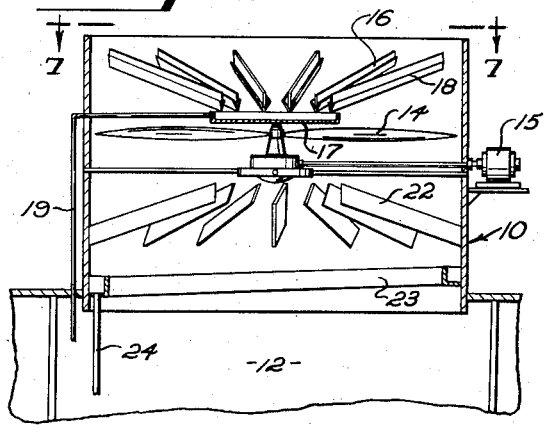
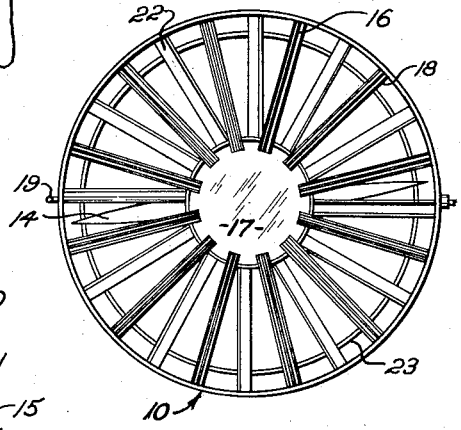
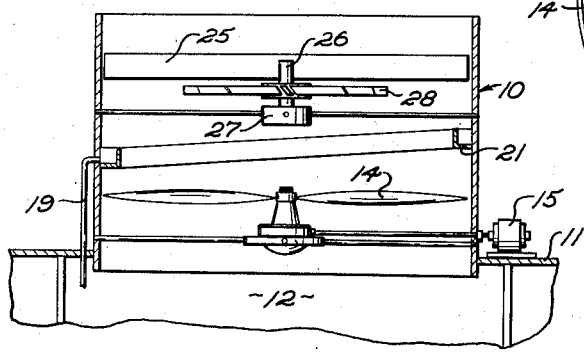
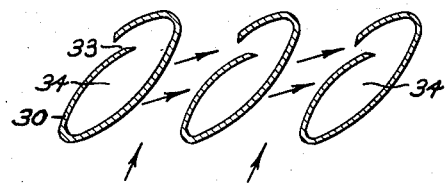
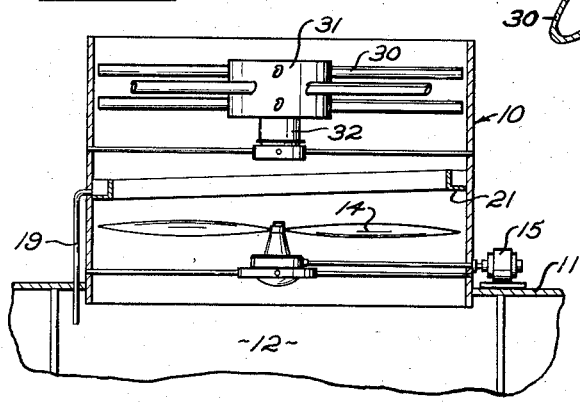
WILLIAM D. LANIER
ROBERT L. SOLNICK
INVENTOR.
BY
ATTORNEY

2,859,831

COOLING TOWER MIST ELIMINATOR

Robert L. Solnick, Whittier, and William D. Lanier, Garden Grove, Calif., assignors to The Fluor Corporation, Ltd., Los Angeles, Calif., a corporation of California Application January 9, 1956, Serial No. 557,918

9 Claims. (Cl. 183—22)

This invention relates generally to detrainment or separation of water in the form of moisture from a condition of entrainment in air flowing from or within a water cooling tower, and more particularly has to do with detrainment of such air-borne moisture while the latter has a relatively high flow velocity, as distinguished from the relatively low velocity of the air streams flowing within the tower cooling chamber, together with the prevention of re-entrainment of the separated moisture into the high velocity flow.

In the past, moisture eliminating baffle systems have generally been utilized within the relatively large sized cooling tower chambers at locations for intercepting the relatively slowly flowing air in the chambers. For example, typical commercial towers of induced draft counterflow design employ closely spaced baffles extending completely across the upper portions of the tower chambers above the water distributing ducts and nozzles.

However, the use of large scale, extensive baffle systems in which the baffles extend in closely spaced relation across the tower chamber presents the disadvantages of initially substantially increasing the cost of tower construction, together with the continuing effect of the baffles in obstructing the flow of air in the chamber to the extent that a greater load is imposed on the fans drawing air through the tower, adding to the cost of tower operation. More importantly, water separating out of the air onto such baffles remains subject to re-entrainment in the air flowing thereby, since the water separation is not separated out of the path of the air streams.

The present invention seeks to overcome the disadvantages inherent in the use of extensive closely spaced baffles within the tower chamber, through the concept of delaying detrainment of moisture from the air until the air is flowing at a relatively high velocity through the stack above the tower chamber, and then securing and maintaining separation of water from the air in the stack. As a result, the need for baffles in the tower chamber is eliminated, together with their disadvantages.

In the present invention the otherwise wasted, fan induced spiral flow energy of the air and moisture is put to use to achieve moisture detrainment by providing means projecting into the high velocity spiraling flow and presenting to it an extended surface acting to deflect the flow, with the result that water particles entrained in the air are caused, by virtue of their high velocity, to impinge upon the surface and separate from the deflected flow. Furthermore, re-entrainment of the moisture separation is prevented by providing a collector receiving the separated water and conducting it down into the cooling chamber out of contact with the air streams flowing up through the stack. In addition, fan performance is substantially improved since flow obstructing, extensive baffle systems in the tower chamber are eliminated.

Deflection of flow within the stack either upstream or downstream of the fan is accomplished by providing one or more elongated baffles projecting within the stack. These baffles may also project relatively upstream or downstream into the flow within the stack, so that moisture impinging on the baffles may drain downward upon them for collection by receptacles positioned below the lowermost edges of the baffles. From the receptacles, moisture is conducted through a suitable duct or ducts to the cooling tower below the stack assembly and out of contact with the air streams flowing up through the stack.

In addition, the baffle or baffles may be mounted for rotation within the stack, typically downstream of the fan, so that rotating baffles cause centrifugal throw-out of water entrainment from the air onto another surface within the stack out of the direct path of the flow therein. Water entrainment thrown upon the surface in this manner may then be collected in a suitable receptacle receiving drainage from the surface. The rotating blades may be formed, as will be described, with hollow interiors and surface openings conducting water entrainment from the blade surfaces into their interiors to be subsequently thrown outwardly through the open ends of the blades.

In those instances where the baffles are located upstream from the fan within the stack, they may be angled to induce the flow in a spiral direction leading it into the fan, thereby reducing the required power input to the fan. Also, those baffles positioned downstream of the fan are desirably mounted in planes extending substantially parallel to the stack axis, so that the spiraling flow may be straightened prior to its discharge from the stack. As a result, the tendency of the high humidity air flow leaving the stack to settle and to re-enter the cooling tower is minimized, since the straightened flow continues in an upward direction for a substantial distance after leaving the stack. Also, straightening the air flow downstream of the fan converts its rotational enregy to static head, thereby improving fan efficiency.

Other objects and features of the invention, as well as the details of an illustrative embodiment will be more fully understood from the following detailed description of the drawings, in which:

Fig. 1 is a vertical section taken through the upper portion of the cooling tower and the stack assembly;

Fig. 2 is a plan view of the stack taken on line 2—2 of Fig. 1;

Fig. 3 is an enlarged section taken on line 3—3 of Fig. 2;

Fig. 4 is a view similar to Fig. 3 showing a slightly different form of baffle;

Fig. 5 is a view similar to Fig. 1 showing a different baffle arrangement within the stack assembly;

Fig. 6 is another view similar to Fig. 1 showing still a different baffle arrangement in the stack assembly;

Fig. 7 is a plan view of the stack assembly taken on line 7—7 of Fig. 6;

Fig. 8 is a view similar to Fig. 1 showing a rotating baffle within the stack;

Fig. 9 is a view similar to Fig. 8 showing a number of rotating baffles within the stack; and Fig. 10 is an enlarged section showing in detail the construction of the rotating baffles.

Referring to Figs. 1 to 3, the generally cylindrical stack 10 is mounted above the cooling tower 11 and the cooling chamber 12 communicating directly with the interior 13 of the stack. A suitable fan 14 is mounted within the stack and driven by a motor 15 so that the fan draws moisture laden air from within the cooling chamber upwardly within the stack, the fan imparting to the flow a high velocity in a spiral direction with the stack.

Also mounted within the stack are a series of baffles 16 projecting laterally into the spiraling flow from the inner surface of the stack. For flow straightening purposes, the baffles are arranged to extend in planes substantially parallel to the axis of the stack, and they also project relatively downwardly or upstream toward a central receptacle 17 located beneath their lowermost ends. Additional V-shaped receptacles 18 are suitably mounted directly below the elongated lower edges of the baffles for receiving drainage from the baffles and delivering it to the central receptacle 17, from which the collected water is conducted to the exterior of the stack and reintroduced to the tower chamber through a duct 19. In those instances where the baffles are sufficiently angled in the upstream direction, the receptacles 18 may be eliminated since the water detrainment adhering to the baffles by virtue of its surface tension, will flow downward in the upstream direction toward central receptacle 17.

The high velocity flow within the stack, having a spiraling and upwardly flow direction as indicated by the arrow 20 in Fig. 3, is deflected and straightened by the baffles 16, so that entrained water particles tend, by virtue of their mass, to leave the flow and to impinge upon the baffles, to which the water adheres and upon which it drains downwardly into the V-shaped receptacles 18. As a result, efficient moisture detrainment and straightening of the air flow is accomplished simultaneously by the baffles extending within the stack. Furthermore, straightening of the air flow converts otherwise wasted rotational energy of the flow into static head.

In those instances where the velocity of the spiraling flow and entrained moisture is relatively high, the tendency for the moisture droplets impinging upon the baffles to splash and to be re-entrained by the air may be minimized by providing porous or cellular baffles of the type shown in Fig. 4. With the baffles constructed for example of laminated plastic, fiber glass, metallic or plastic screen or wool, or similar material, the impinging water droplets tend to penetrate beneath the baffle surfaces into their interiors, for subsequent downward drainage into the receptacles. Such baffles must be sufficiently porous to allow the droplets to penetrate their surfaces and yet dense enough to prevent passage of air through the baffles. Also, liquid droplets may be prevented from passing completely through the baffles by making them sufficiently thick.

Referring to the embodiment shown in Fig. 5, the baffles 16 are shown projecting into the spiraling flow from the inner surfaces of the stack to a common junction at the axis of the stack. They also project downstream away from the fan so that their outward ends proximate the inner surfaces of the stack are lowermost, and water draining from the baffles is collected by an annular trough or receptacle 21 mounted directly below their outer ends. This baffle construction provides for minimum obstruction to the spiraling flow passed upward through the stack since the latter is relatively open downstream of the fan.

In Figs. 6 and 7, groups of baffles 16 and 22 are positioned respectively downstream and upstream of the fan 14 and project laterally into the flow within the stack. The downstream baffles 16 are arranged generally as shown in Fig. 1, whereas the upstream baffles 22 are inclined in a direction opposite the direction of fan rotation, as shown in Fig. 7 so that air passing through the baffles is directed relatively into the rotating fan at an angle therewith depending on fan design and operating conditions. Since the baffles 22 are inclined in a direction opposite the direction of fan rotation, and since the rotating fan blades displace air upwardly through the stack, the major lengthwise extents of each fan blade and baffle underlying the blade during fan rotation have chordwise extending cross sections substantially normal to the lengthwise extents of the blades and baffles respectively, those cross sections being angled in the same angular direction with respect to vertical lines therethrough. Also, the fan rotates so that each fan blade lower edge passes in sequence over the upper and lower edges of each baffle, and so that the fan blade lower and upper edges are leading and trailing respectively. As used herein, the terms "chordwise" or "chord" made in reference to the cross sections of the blades and baffles shall be understood to mean the distance of a straight line between the leading and trailing edges of the blades and baffles. The term "chordwise" made in reference to the cross sections of the blades and baffles is drawn from aeronautics in that the "chord" of an airfoil section is commonly known as a measure of the distance between the leading and trailing edges of the section. Therefore, a chordwise extending cross section of a fan blade is a cross section taken between the leading and trailing edges of an airfoil section of the fan blade. Also, the upstream baffles project upwardly toward the fan at angles of around 15 degrees. As a result, the baffles 22 tend to induce the flow entering the stack into a spiral path leading into the fan, thereby aiding in directing the flow to the end that spiraling of the flow is substantially reduced and the power input to the fan may be substantially reduced.

Also shown in Fig. 6 and 7 is an annular receptacle 23 positioned adjacent the inner surface of the stack and below the outward ends of the upstream set of baffles 22 for receiving water draining therefrom. Both sets of baffles 16 and 22 as shown in Figs. 6 and 7 act to deflect the flow, and they therefore tend to collect moisture, which is ultimately re-introduced to the tower cooling chamber out of contact with the air stream flowing up through the stack, ducts 19 and 24 serving this purpose. The latter duct, communicating with annular receptacle 23, extends downward into the cooling chamber 12 for draining water downward therein.

Referring to Figs. 8 through 10 and particularly to Fig. 8, a single baffle 25 shown as vertical merely for purposes of illustration extends transversely within the stack and is mounted for rotation by a shaft 26 turning in centrally supported bearing 27. The baffle extends almost completely across the stack interior for intercepting and deflecting the spiral flow, and a number of relatively smaller-sized angled blades 28 are also mounted by the shaft 26 to extend part way across the stack interior between the fan and the baffle. These blades also intercept the flow, and are pitched to be driven in rotation by the spiraling flow imparting rotation to the baffle 25. Particles of moisture carried upwardly within the stack by the high velocity spiraling flow are intercepted by the rotating baffle 25, since the latter rotates more slowly than the spiraling flow. Moisture collecting on the baffle surfaces is then thrown outward upon the interior surface of the stack 10, where it drains downward into the annular receptacle 21 and is subsequently conducted by duct 19 to the cooling tower chamber 12.

In Fig. 9, a number of baffles 30 extend laterally within the stack toward its inner surface from central support 31, which is rotated by a centrally mounted motor 32. These baffles radiate from the support 31 and are inclined, as shown in Fig. 10, relative to the stack axis. Upon being rotated in an angular direction opposite to the spiraling flow within the stack, the baffles 30 intercept the moisture laden flow, causing moisture particles to impinge upon the baffle surfaces from which the moisture is thrown outward toward the inner surface of the stack 10. The angular rotation of the baffles may be suitably adjusted in relation to the oppositely directed flow of the rising air, so that the discharging flow may be straightened to leave the stack vertically, for the purposes outlined in the introduction. Also, the inclined baffles 30 may have openings 33 formed in their upper surface for conducting moisture collecting thereon into the hollow baffle interiors 34. Moisture may then be thrown outward through the open ends of the rotating baffles out of contact with the rising air within the stack, minimizing moisture re-entrainment. An annular receptacle 21 is provided adjacent the inner surface of the stack for receiving moisture draining downward, and a duct 19 is again provided to pass the water from the receptacle downward into the cooling chamber 12.

We claim:

1. In an induced draft water cooling tower having a vertically extending cooling chamber within which water is passed downwardly in contact with upwardly displaced air, a moisture detraining assembly including a stack above said chamber having a vertical axis, a fan within the stack having blades extending radially from said axis and rotating to displace air from said chamber in a high velocity course of flow upwardly into the stack and circularly spaced baffles underlying the blades and projecting lengthwise within the stack inwardly toward the axis thereof into the flow presenting thereto an extended surface acting to deflect the flow in a spiral course whereby entrained water particles are caused to impinge upon said surface and separate from the flow, the major lengthwise extents of each fan blade and baffle underlying said blade during fan rotation having chordwise extending cross sections substantially normal to the lengthwise extents of the blades and baffles respectively, said sections being angled in the same angular direction with respect to vertical lines therethrough, said fan rotating so that each blade lower edge passes in sequence over the upper and lower edges of each baffle whereby spiraling of the flow is substantially reduced, the stack having reduced horizontal cross sectional area in relation to the horipontal cross sectional area of said chamber so that air flow in the stack has increased velocity in relation to air velocity in said chamber, means distributing water into the air within said chamber below said baffles, and means above said water distribution means receiving separated water and conducting it down into said cooling chamber out of contact with the air stream flowing up through the stack.

2. In an induced draft water cooling tower having a vertically extending cooling chamber within which water is passed downwardly in contact with upwardly displaced air, a moisture detraining assembly including a stack above said chamber having a vertical axis, a fan within the stack having blades extending radially from said axis and rotating to displace air from said chamber in a high velocity course of flow upwardly into the stack and circularly spaced baffles underlying the blades and projecting lengthwise within the stack inwardly toward the axis thereof and upwardly into the flow presenting thereto an extended surface angled with respect to the flow direction and acting to deflect the flow in a spiral course whereby entrained water particles are caused to impinge upon said surface and separate from the flow, the major lengthwise extents of each fan blade and baffle underlying said blade during fan rotation having chordwise extending cross sections substantially normal to the lengthwise extents of the blades and baffles respectively, said sections being angled in the same angular direction with respect to vertical lines therethrough, said fan rotating so that each blade lower edge passes in sequence over the upper and lower edges of each baffle whereby spiraling of the flow is substantially reduced, the stack having reduced horizontal cross sectional area in relation to the horizontal cross sectional area of said chamber so that air flow in the stack has increased velocity in relation to air velocity in said chamber, means distributing water into the air within said chamber below said baffles, and a collector above said water distribution means and below said baffles receiving separated water and conducting it down into said cooling chamber out of contact with the air stream flowing up through the stack.

3. In an induced draft water cooling tower having a vertically extending cooling chamber within which water is passed downwardly in contact with upwardly displaced air, a moisture detraining assembly including a stack above said chamber having a vertical axis, a fan within the stack having blades extending radially from said axis and rotating to displace air from said chamber in a high velocity course of flow upwardly into the stack and circularly spaced baffles underlying the blades and projecting lengthwise within the stack inwardly toward the axis thereof into the flow and presenting thereto an extended surface acting to deflect the flow in a spiral course whereby entrained water particles are caused to impinge upon said surface and separate from the flow, the major lengthwise extents of each fan blade and baffle underlying said blade during fan rotation having chordwise extending cross sections substantially normal to the lengthwise extents of the blades and baffles respectively, said sections being angled in the same angular direction with respect to vertical lines therethrough, said fan rotating so that each blade lower edge passes in sequence over the upper and lower edges of each baffle whereby spiraling of the flow is substantially reduced, the stack having reduced horizontal cross sectional area in relation to the horizontal cross sectional area of said chamber so that air flow in the stack has increased velocity in relation to air velocity in said chamber, means distributing water into the air within said chamber below said baffles, a collector above said water distribution means and below said baffles receiving separated water and conducting it down into said cooling chamber out of contact with the air stream flowing up through the stack, and other openly circularly spaced baffles overlying the fan blades and projecting lengthwise within the stack inwardly toward the axis thereof.

4. In an induced draft water cooling tower having a vertically extending cooling chamber within which water is passed downwardly in contact with upwardly displaced air, a moisture detraining assembly including a stack above said chamber having a vertical axis, a fan within the stack having blades extending radially from said axis and rotating to displace air from said chamber in a high velocity course of flow upwardly into the stack and circularly spaced baffles underlying the blades and projecting lengthwise within the stack inwardly toward the axis thereof into the flow in spaced relation to the fan, said baffles presenting to the flow an extended surface acting to deflect the flow in a spiral course whereby entrained water particles are caused to impinge upon the surface and separate from the flow, the major lengthwise extents of each fan blade and baffle underlying said blade during fan rotation having chordwise extending cross sections substantially normal to the lengthwise extents of the blades and baffles respectively, said sections being angled in the same angular direction with respect to vertical lines therethrough, said fan rotating so that each blade lower edge passes in sequence over the upper and lower edges of each baffle whereby spiraling of the flow is substantially reduced, the stack having reduced horizontal cross sectional area in relation to the horizontal cross sectional area of said chamber so that air flow in the stack has increased velocity in relation to air velocity in said chamber, means distributing water into the air within said chamber below said baffles, means including a first receptacle above said water distribution means and conducting separated water down into said cooling chamber out of contact with the air stream flowing up through the stack, and other openly circularly spaced baffles overlying the fan blades and projecting lengthwise within the stack inwardly toward the axis thereof in substantially vertical planes for guiding the flow discharging from the fan vertically upwardly.

5. The combination, comprising an induced draft water cooling tower having a vertically extending cooling chamber within which water is passed downwardly in contact with upwardly displaced air, a moisture detraining assembly including a stack above said chamber having a vertical axis, a fan within the stack having blades extending radially from said axis and rotating to displace air from said chamber in a high velocity course of flow upwardly into the stack and circularly spaced baffles underlying the blades and projecting lengthwise within the stack inwardly toward the axis thereof into the flow presenting thereto an extended surface acting to deflect the flow in a spiral course whereby entrained water particles are caused to impinge upon said surface and separate from the flow, the major lengthwise extents of each fan blade and baffle underlying said blade during fan rotation having chordwise extending cross sections substantially normal to the lengthwise extents of the blades and baffles respectively, said sections being angled in the same angular direction with respect to vertical lines therethrough, said fan rotating so that each blade lower edge passes in sequence over the upper and lower edges of each baffle whereby spiraling of the flow is substantially reduced, the stack having reduced horizontal cross sectional area in relation to the horizontal cross sectional area of said chamber so that air flow in the stack has increased velocity in relation to air velocity in said chamber, means distributing water into the air within said chamber below said baffles, and a collector above said water distribution means and below said baffles receiving separated water and conducting it down into said cooling chamber out of contact with the air stream flowing up through the stack, said tower chamber being essentially open everywhere below said baffles and above said water distributing means.

6. The invention as defined in claim 2 comprising an annular receptacle below the lowermost ends of the baffles and adjacent the innerside of the stack.

7. The invention as defined in claim 4 including other receptacle means directly below said other baffles receiving water draining therefrom.

8. The invention as defined in claim 7 in which said other baffles and receptacles project downwardly and toward the stack axis and in which said other receptacles are V shaped and open upwardly toward the other baffles.

9. The invention as defined in claim 8 comprising a duct discharging separated water in a continuous stream into said chamber.

References Cited in the file of this patent
UNITED STATES PATENTS

| | | |
|---|---|---|
| 1,836,338 | Rodman et al. | Dec. 15, 1931 |
| 2,052,783 | Mart | Sept. 1, 1936 |
| 2,076,119 | Carraway | Apr. 6, 1937 |
| 2,136,003 | Coey | Nov. 8, 1938 |
| 2,299,920 | Moore | Oct. 27, 1942 |
| 2,311,155 | Carr | Feb. 16, 1943 |
| 2,314,986 | Johnson | Mar. 30, 1943 |
| 2,409,088 | Weits et al. | Oct. 8, 1946 |
| 2,501,614 | Price | Mar. 21, 1950 |
| 2,532,332 | Rowand | Dec. 5, 1950 |
| 2,596,782 | Moore | May 13, 1952 |
| 2,643,736 | Smith | June 30, 1953 |